(12) United States Patent
Suzuki (10) Patent No.: US 7,056,587 B2
(45) Date of Patent: Jun. 6, 2006

(54) LOW-REFLECTIVE THIN-FILM SUBSTRATE

(75) Inventor: Tadakatsu Suzuki, Miyagi (JP)

(73) Assignee: Kuramoto Seisakusho Co., Ltd., Miyagi (JP)

(*) Notice: Subject to any disclaimer, the term of this patent is extended or adjusted under 35 U.S.C. 154(b) by 0 days.

(21) Appl. No.: 10/807,189

(22) Filed: Mar. 24, 2004

(65) Prior Publication Data

US 2004/0180219 A1 Sep. 16, 2004

Related U.S. Application Data

(63) Continuation of application No. 10/368,366, filed on Feb. 20, 2003, now abandoned, which is a continuation of application No. 10/090,725, filed on Mar. 6, 2002, now abandoned, which is a continuation of application No. 09/691,246, filed on Oct. 19, 2000, now abandoned, which is a continuation of application No. 09/125,777, filed as application No. PCT/JP97/00553 on Feb. 26, 1997, now abandoned.

(30) Foreign Application Priority Data

| Feb. 26, 1996 | (JP) | ................................ 8-038425 |
| Mar. 4, 1996 | (JP) | ................................ 8-046481 |
| Apr. 17, 1996 | (JP) | ................................ 8-095708 |

(51) Int. Cl.
*B32B 15/04* (2006.01)

(52) U.S. Cl. ............... 428/432; 428/433; 428/469; 428/472; 428/701; 359/359; 359/360

(58) Field of Classification Search ........ 428/432–433, 428/469, 472, 701; 438/433; 359/359–360, 359/585

See application file for complete search history.

(56) References Cited

U.S. PATENT DOCUMENTS

| 4,712,874 A | 12/1987 | Sekimura et al. |
| 4,802,743 A | 2/1989 | Takao et al. |
| 5,083,853 A | 1/1992 | Ueki et al. |
| 5,142,392 A | 8/1992 | Ueki et al. |
| 5,714,268 A | 2/1998 | Anderson et al. |
| 6,445,503 B1 * | 9/2002 | Lingle ....................... 359/585 |

FOREIGN PATENT DOCUMENTS

| JP | 01142712 A | 6/1989 |
| JP | 06299354 A | 10/1994 |
| JP | 07267681 A | 10/1995 |

* cited by examiner

*Primary Examiner*—Cathy F. Lam
(74) *Attorney, Agent, or Firm*—Wenderoth, Lind & Ponack, L.L.P.

(57) ABSTRACT

A low-reflective thin-film substrate comprising a transparent glass substrate having formed by sputtering a thin film in multilayer containing no chromium series component and made up of at least one kind of Ni, Fe, Co, Mo, W, Ta, Cu, and Nb as a main constituent form or as an alloy thereof, the thin film having a minimum reflectivity of 0.5% or lower and the optical density of at least 4 or having a minimum reflectivity of 0.1% or lower, a maximum reflectivity of 2.0% or lower, an average reflectivity of 0.3% or lower, and an optical density of at least 4.0, in the visible light region. The low-reflective thin-film substrate is useful as a black matrix for a color filter substrate of a liquid crystal panel, etc., and is free from an environmental pollution caused by the use of a chromium component as the target material.

5 Claims, 9 Drawing Sheets

LOW-REFLECTIVE THIN-FILM SUBSTRATE

This application is a continuation of Ser. No. 10/368,366 filed Feb. 20, 2003, now abandoned, which is a continuation of Ser. No. 10/090,725 filed Mar. 6, 2002, now abandoned, which is a continuation of Ser. No. 09/691,246 filed Oct. 19, 2000, now abandoned, which is a continuation of Ser. No. 09/125,777 filed Feb. 16, 1999, now abandoned, which is a 371 application of international application No. PCT/JP97/00553 filed Feb. 26, 1997.

FIELD OF THE INVENTION

The present invention relates to a low-reflective thin-film substrate. More specifically, the present invention relates to a low-reflective metal•alloy system thin-film substrate which is used in the fields relating to an optical thin film having a light shielding property and a light reflection preventing property, such as, for example, a black matrix particularly useful for the production of a color filter substrate for a liquid crystal panel and a projector frame useful for the production of a projector.

BACKGROUND OF THE INVENTION

A color liquid crystal panel is utilized over a wide field in display devices of information instruments, etc., and with the progress of the recent information-oriented society, the development aiming at a larger picture and a higher precision has been made.

In such a color liquid crystal panel, to increase the contrast of the picture and to sharpen the displayed picture by increasing the coloring effect, each black matrix showing a less reflectance and having a good light-shielding property is disposed between each color filter pixels of red (R), green (G), and blue (B).

Hitherto, the black matrix is produced by applying patterning by etching using a known photolithographic technique to a low-reflective thin-film substrate formed by laminating metal layers, etc., by sputtering metal targets such as chromium, etc. As such a laminated low-reflective thin-film substrate, a low-reflective thin-film substrate formed by laminating a chromium oxide layer and a chromium metal layer is known.

In this case, because the reflectivity is restrained by the interference of light by the laminated layers in multilayer and the laminated layers included a chromium metal layer having a high reflectivity and a less transmissibility of light, the laminated low-reflective thin-film substrate has a light-shielding function.

Also, in regard to the black matrix, it has been required to lower the reflectivity for easily seeing images by restraining the reflection images such as a face, etc., and the background onto a display panel as completely as possible and also to keep the optical density of the black matrix above a definite level because if the light from a back light in the inside of the panel transmits, the color tone does not become clear.

From the view point, to produce a low-reflective thin-film substrate having a low reflectivity and a definite optical density, a method of forming film(s) by sputtering a material containing chromium metal as a target has hitherto been known and utilized as a typical technique.

However, in general, chromium having other valences than hexavalence has less toxicity but chromium having a hexa-valence has a strong toxicity and there is a problem of causing an environmental pollution. Thus, recently, in view of public opinion, there is a tendency of restraining the use of chromium metal in the production of liquid crystal panels and a low-reflective thin-film substrate containing no chromium component has been required.

Furthermore, although in a known low-reflective chromium thin film, the minimum reflectivity is 0.5% or lower (the wavelength is about 600 nm) and the optical density is 4.0 or higher, it is the present situation that the average reflectivity (the value obtained by summing up the reflectivities per an interval of, for example, 1 nm in wavelength and dividing the sum up value by the number of the measured points) in a wavelength region of from 400 to 700 nm (almost the whole region of visible light) is 1.5% or higher and the maximum reflectivity exceeds 5%. The reflectivity is confirmed by measuring an aluminum thin film as a reference using a microspectroscope, OSP-SP 200, trade name, manufactured by Olympus Optical Company Limited and does no contain the reflectivity from a glass surface.

In general, in a low-reflective thin-film substrate wherein the minimum reflectivity is 0.5% or lower and the maximum reflectivity exceeds 5%, the reflected color is influenced by the wavelength showing the maximum reflectivity. In fact, for example, in the wavelength region of from 400 to 700 nm, when the wavelength showing the maximum reflectivity is in a short wavelength side of 400 nm (near), a bluish purple color is emphasized in the reflected color and when the wavelength showing the maximum reflectivity is in a long wavelength side of 700 nm (near), a red color is emphasized in the reflected color.

When such a low-reflective thin-film substrate is used as a projector frame, there is a fault that the frame projected onto a screen becomes bluish purple or red.

Also, it is proposed to use a resin as a low-reflective thin-film substrate but in the case of using the resin, because the resin is inferior in the points of the light resistance and the heat resistance as compared with the case of using inorganic materials, there is a problem that the optical characteristics are greatly deteriorated by an intense light source.

Accordingly, recently, the realization of a low-reflective thin-film substrate which does not cause an environmental problem as caused in the case of a chromium substrate as described above as well as has a low reflectivity in almost all the wavelength region of visible light and also is excellent in the light resistance has been required.

SUMMARY OF THE INVENTION

The present invention has been made for solving the above-described problems in the conventional techniques.

That is, according to a first aspect of the present invention, there is provided a low-reflective thin-film substrate comprising a transparent glass substrate having formed thereon by sputtering a thin film made of at least one kind of Ni, Fe, Co, Mo, W, Ta, and Nb and having a minimum reflectivity of 0.5% or lower and an optical density of at least 4 in the visible light region.

Also, according to a second aspect of the present invention, there is provided a low-reflective thin-film substrate comprising a transparent glass substrate having formed thereon by sputtering a thin film in multilayer containing no Cr and made of at least one kind of Ni, Fe, Co, Mo, W, Ta, Cu, and Nb.

Furthermore, according to a third aspect of the present invention, there is provided a low-reflective thin-film substrate comprising a transparent glass substrate having formed thereon by sputtering an aluminum series thin film having a minimum reflectivity of 0.5% or lower and an average reflectivity of 2% or lower in a visible light region.

Also, according to a fourth aspect of the present invention, there is provided a low-reflective thin-film substrate of the third aspect wherein the optical density of the thin film is at least 4.

Still further, according to a fifth aspect of the present invention, there is provided a low-reflective thin-film substrate comprising a transparent glass substrate having formed thereon by sputtering a thin film or a thin film in multilayer containing no Cr and made of aluminum as a main constituent.

Also, according to a sixth aspect of the present invention, there is provided a low-reflective thin-film substrate comprising a transparent glass substrate having formed thereon by sputtering a thin film having a minimum reflectivity of 0.1% or lower, a maximum reflectivity of 2.0% or lower, and an average reflectivity of 0.3% or lower in the visible light region.

Furthermore, according to a seventh aspect of the present invention, there is provided a low-reflective thin-film substrate of the sixth aspect wherein the optical density of the thin film is at least 4.0.

Still further, according an eighth aspect of the present invention, there is provided a low-reflective thin-film substrate comprising a transparent glass substrate having formed thereon by sputtering a thin film of Ta in multilayer.

Also, according to a ninth aspect of the present invention, there is provided a low-reflective thin-film substrate of the eighth aspect wherein the thin film of Ta contains at least one kind of Ni, Fe, Co, W, Nb, Cu, Ti, Zr, and Sn.

Moreover, according to a tenth aspect of the present invention, there is provided a low-reflective thin-film substrate of the first to ninth aspects wherein sputtering is carried out under a gas atmosphere of at least one kind of an inert gas, an oxygen gas, and a carbon oxide gas in a vacuum film-forming apparatus.

That is, according to the present invention, the low-reflective thin-film substrate is obtained without using a chromium series metal in the production process thereof as well as the characteristics such as the optical density, the reflectivity, etc., thereof are by no means inferior to the characteristics of the case of forming the thin film using a chromium series metal and further, the results that the reflectivity is low in the wide wavelength region of visible light and the form of the spectral reflectivity curve is flattened in a wide range are also obtained.

DETAILED DESCRIPTION OF THE INVENTION

Then, the present invention is described in detail.

As described above, the essential feature of the low-reflective thin-film substrate of the present invention is that it is the low-reflective thin-film substrate having the optical characteristics which have never been known as a low-reflective thin-film substrate and that it does not contain chromium at all.

The low-reflective thin-film substrate of the present invention is laminated in multilayer as a conventional low-reflective chromium thin-film substrate and, for example, is laminated in from about 2 to 7 layers. In this case, the thickness of each layer is properly selected.

In the present invention, sputtering can be practiced as so-called reactive gas sputtering and an inert gas such as nitrogen, etc., including a rare gas such as argon, etc., an oxygen gas, or a carbon oxide gas such as CO, $CO_2$, etc., is shown as a typical example of the atmosphere for sputtering.

The target material includes iron group metals, that is, the materials made up of at least one kind of Ni, Fe, Co, Mo, W, Ta, and Nb, for example, typically, alloys such as Ni—Fe (Permalloy), Ni—Co, Fe—Co, Ni—Fe—Co, Ni—Mo, Ni—W, Ni—Ta, Fe—Mo, Fe—W, Fe—Nb, Ni—Cu, Ni—Mo—Ta, etc., and metals such as Ta, Nb, etc. In sputtering wherein the target material may contain at least one kind of Cu, Ti, Zr, and Sn as an accelerating addition component, in the case of the sputtering film formation of two layers, it is considered to make the thickness of the first layer (the layer formed on a transparent glass substrate) to the range of from 30 to 60 nm and the thickness of the second layer to the range of from 70 to 160 nm, and also in the case of the sputtering film formation of three layers, to make the thickness of the first layer to the range of from 1 to 60 nm, the thickness of the second layer to the range of from 20 to 80 nm, and the thickness of the third layer to the range of from 80 to 150 nm.

In sputtering using as the target material an aluminum series material, such as, typically, aluminum or a material made up of aluminum as a main constituent, which further properly contains titanium, zirconium, tantalum, hafnium, and other elements, in the case of the sputtering film formation of three layers, it is considered to make the thickness of the first layer (the layer formed on a transparent glass substrate) to the range of from 40 to 60 nm, the thickness of the second layer to the range of from 280 to 320 nm, and the thickness of the third layer to the range of from 40 to 100 nm.

Also, in sputtering using as the target material Ta or a Ta alloy containing at least one kind of Ni, Fe, Co, and W, the Ta or Ta alloy further contains at least one kind of Cu, Ti, Zr, and Sn, the low-reflective thin-film substrate obtained has a light-shielding function because the reflectivity is restrained by the interference of light caused by the laminated layers in multilayer and the laminated layers includes a tantalum metal layer having a high reflectivity and a less transmissivity of light. In the sputtering film formation of this case, it is considered to make the thickness of the first layer (the layer formed on a transparent glass substrate) to the range of from 40 to 60 nm, the thickness of the second layer to the range of from 20 to 50 nm, and the thickness of the third layer to the range of from 150 to 200 nm.

The following Examples are intended to illustrate the present invention in more detail but, as a matter of course, not to limit the invention in any way.

EXAMPLE

Example 1

A transparent glass substrate (thin plate glass, 1737 material, made by Corning Glass Works) was used as a transparent substrate and after washing to obtain a clean surface thereof, the transparent glass substrate was mounted on a batch-type reactive gas sputtering apparatus such that the glass substrate faced a sputtering target made up of a nickel (80 wt. %)-iron (20 wt. %) alloy.

Figure 1:
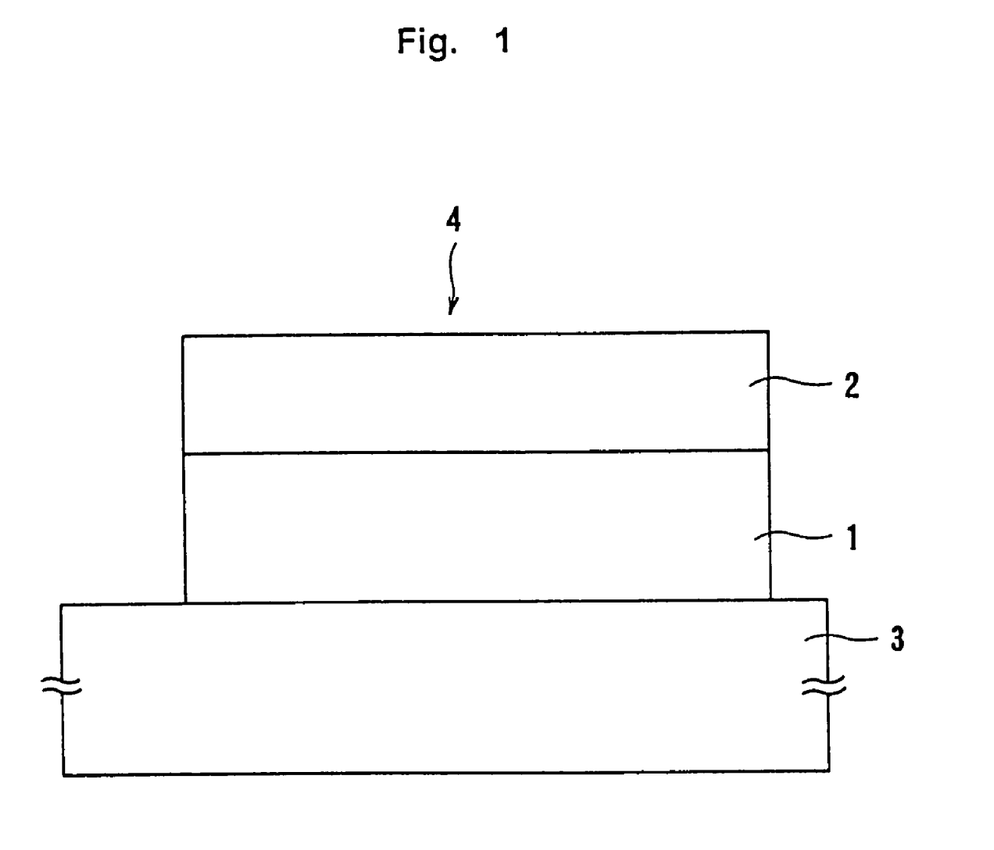
FIG. 1 is a schematic cross-sectional view of a double layer structure illustrating an embodiment of the low-reflective thin-film substrate of the present invention.

The sputtering apparatus was evacuated until the inside pressure became $2.0 \times 10^{-6}$ Torr or lower, then 360 sccm of a nitrogen gas and 40 sccm of an oxygen gas were introduced into the sputtering apparatus, and sputtering was carried out in the atmosphere at a sputtering electric power of 5 kW for 7.5 minutes to form a layer on a transparent glass substrate (3) as shown in FIG. 1 of the accompanying drawing. Also, in this case, the substrate was not heated at sputtering. That is, by the reactive gas sputtering using the above-described nickel-iron alloy as the target, a first layer (1) was formed on the transparent glass substrate (3) at a layer thickness of 44 nm.

Then, 200 sccm of an argon gas was introducing into the sputtering apparatus and sputtering was carried out in the atmosphere of a film-forming pressure of 1.7±0.3 mTorr at a sputtering electric power of 5 kw for about 12 minutes without heating the substrate. By the reactive gas sputtering using the above-described nickel-iron alloy as the target, a second layer (2) was formed on the first layer (1) at a thickness of 110 nm.

The total film-thickness of the low-reflective thin-film substrate (4) of a double-layer structure obtained was about 154 nm. Also, the optical density thereof was 4.3, which shows the excellent light-shielding property of the low-reflective thin-film substrate.

Figure 2:
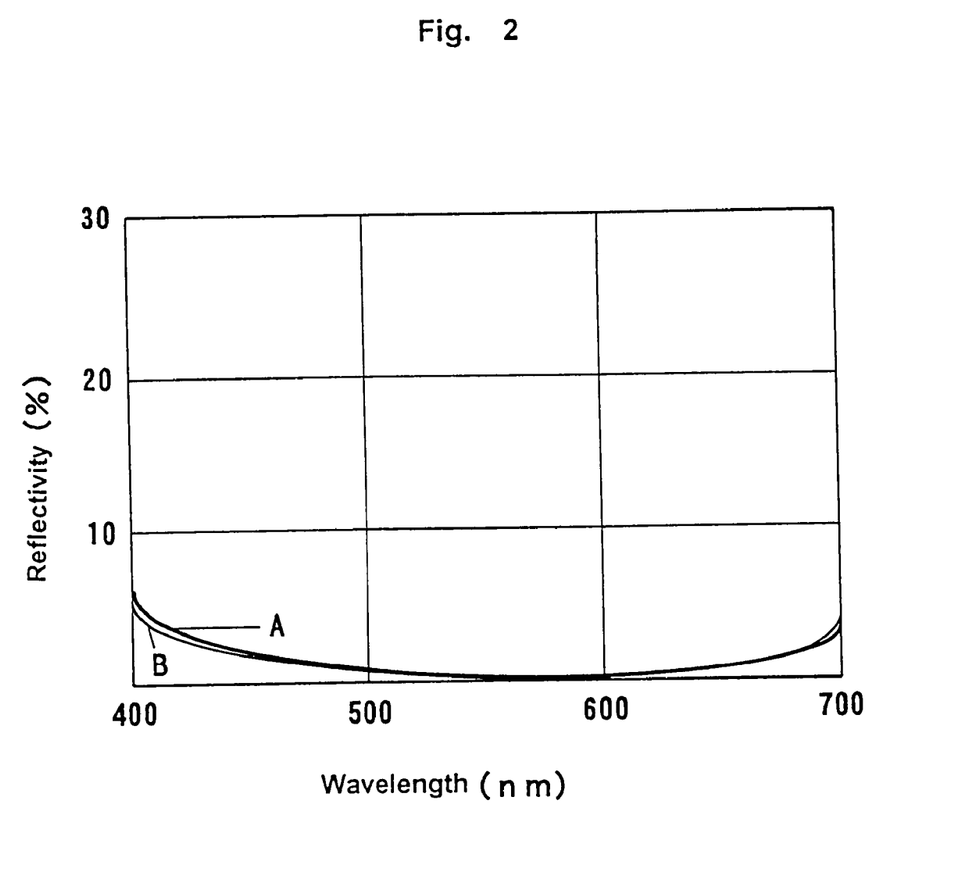
FIG. 2 is a graph illustrating the relation of the wavelength of light and the reflectivity in a low-reflective thin-film substrate, wherein curve A is the curve by the low-reflective nickel-iron alloy thin-film substrate of Example 1 and curve B is the curve by a low-reflective chromium thin-film substrate for comparison.

Also, the relation of the wavelength of light and the reflectivity in the low-reflective thin-film substrate was as shown by the curve A of FIG. 2, that is, the minimum reflectivity in the visible light region (i.e., the wavelength region of from 400 to 700 nm) was 0.05% and the maximum reflectivity was 6.3% when the wavelength was about 600 nm, which were very low. Also, in this case, the reflectivity was measured using a microspectroscope, OSP-SP 200, manufactured by Olympus Optical Company Limited using an aluminum thin film as a reference and did not include the reflectivity from a glass surface and so forth.

For comparison, the reflectivity curve B of a low-reflective thin-film chromium substrate obtained using a chromium metal as the sputtering target was shown together in FIG. 2.

As is clear from the comparison of the curve A with the curve B of FIG. 2, the low-reflective thin-film substrate by the present invention is by no means inferior to the low-reflective chromium thin-film substrate in regard to the optical characteristics such as the minimum reflectivity, etc.

In addition, when the above-described first layer is formed as a multilayer structure by properly changing the kind of the introducing gases and the flow ratio of the introducing gases, the similar low-reflective thin-film substrate is obtained.

As the target material, it was confirmed that in addition to the above-described nickel-iron alloy, a nickel-molybdenum (28 wt. %) alloy, a nickel-tungsten (19.1 wt. %) alloy, nickel alloys containing copper and other elements, etc., were similarly useful for producing the low-reflective thin-film substrates.

Example 2

A film formation was carried out using a sputtering target made of a nickel (72 wt. %)-molybdenum (28 wt. %) alloy and also using the transparent glass substrate and the sputtering apparatus as in Example 1.

Figure 3:
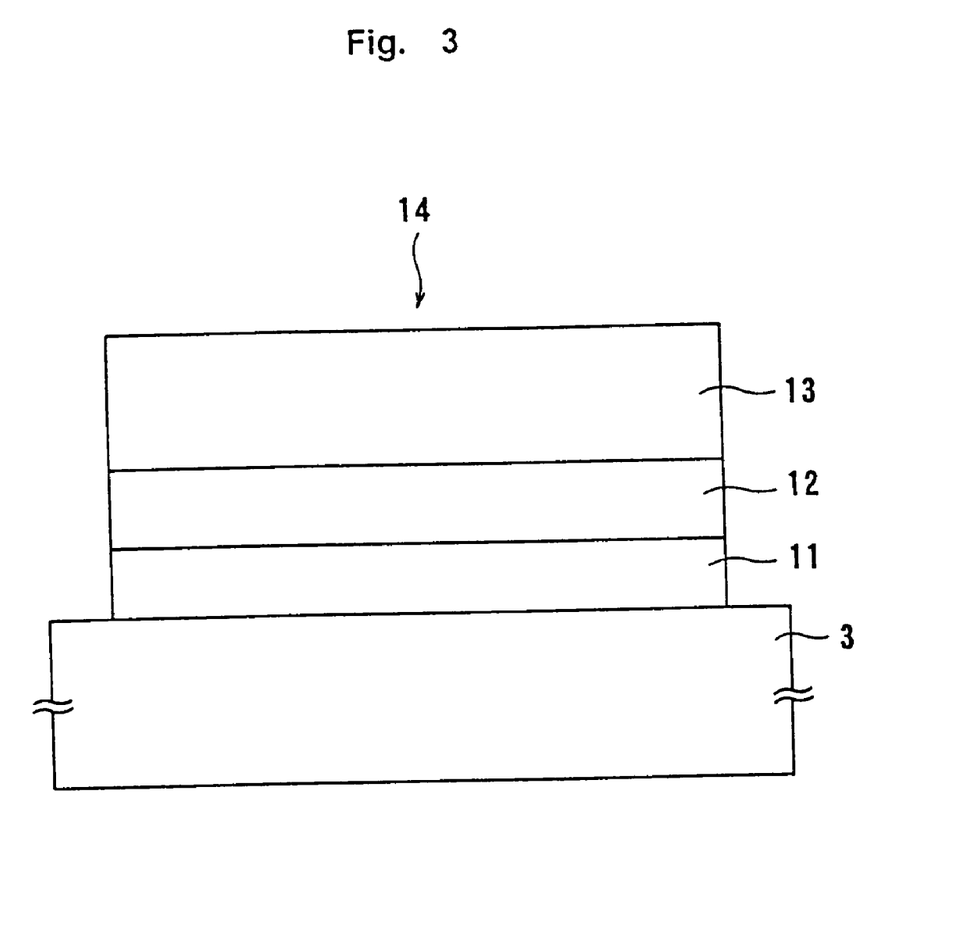
FIG. 3 is a schematic cross-sectional view of a three-layer structure illustrating another embodiment of the low-reflective thin-film substrate of the present invention.

The sputtering apparatus was evacuated until the inside pressure became $2.0 \times 10^{-6}$ Torr or lower and then, after introducing therein 300 sccm of a nitrogen gas and 100 sccm of an oxygen gas, sputtering was carried out in the atmosphere of the film-forming pressure of about 2.3 mTorr at a sputtering electric power of 7.0 kW for 615 seconds. In this case, the temperature of the substrate was about 200° C. By the reactive gas sputtering using the above-described nickel-molybdenum alloy as the target, a first layer (11) was formed on a transparent glass substrate (3) at a thickness of 41 nm as shown in FIG. 3.

Then, 240 sccm of an argon gas, 160 sccm of a nitrogen gas, and 40 sccm of an oxygen gas were introducing into the sputtering apparatus and sputtering was carried out in the atmosphere of a film-forming pressure of about 3.3 mTorr at a sputtering electric power of 8.3 kW for 280 seconds. By the reactive gas sputtering using the above-described nickel-molybdenum alloy as the target, a second layer (12) was formed on the first layer (11) at a thickness of 41 nm.

Then, successively, 200 sccm of a nitrogen gas was introduced into the sputtering apparatus and sputtering was carried out in the atmosphere of the film-forming pressure of about 1.2 mTorr at a sputtering electric power of 8.3 kW for 1330 seconds. By the reactive gas sputtering using the above-described nickel-molybdenum alloy as the target, a third layer (13) was formed on the second layer (12) at a thickness of 115 nm.

In addition, in place of using 200 sccm of the nitrogen gas used for forming the third layer (13), an argon gas or a mixed gas of an argon gas with a nitrogen gas or an oxygen gas can be introduced.

The total film thickness of a low-reflective thin-film substrate (14) of a three-layer structure obtained was 197 nm and the optical density thereof was 4.1, which showed the excellent light-shielding property of the low-reflective thin-film substrate.

Figure 4:
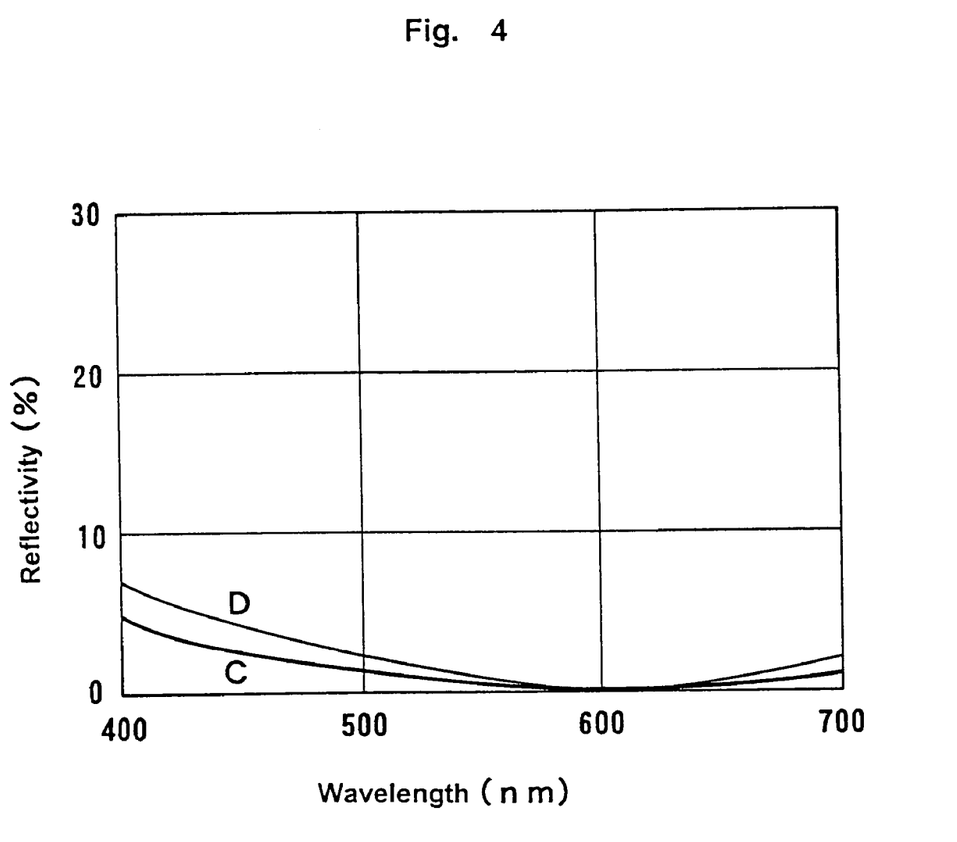
FIG. 4 is a graph illustrating the wavelength of light and the reflectivity in a low-reflective thin-film substrate, wherein curve C is the curve by the low-reflective nickel-molybdenum alloy thin-film substrate of Example 2 and curve D is the curve by the low-reflective nickel-tungsten alloy thin-film substrate of Example 3.

Also, the relation of the wavelength of light and the reflectivity in the low-reflective thin-film substrate obtained is as shown in the curve C of FIG. 4, that is, the minimum reflectivity in the visible light region (i.e., the wavelength region of from 400 to 700 nm) was 0.05% or lower when the wavelength was 600 nm and the maximum reflectivity thereof was 4.7%, which were very low.

Example 3

A film formation was carried out using the sputtering target made up of a nickel (80.9 wt. %)-tungsten (19.1 wt. %) alloy and using the transparent glass substrate and the sputtering apparatus as used in Example 1.

The sputtering apparatus was evacuated until the inside pressure became $2.0 \times 10^{-6}$ Torr or lower and then, after introducing 340 sccm of a nitrogen gas and 60 sccm of an oxygen gas into the sputtering apparatus, sputtering was carried out in the atmosphere of the film-forming pressure of about 2.3 mTorr at a sputtering electric power of 8.3 kW for 195 seconds. Also, in this case, the temperature of the substrate was about 200° C. By the reactive gas sputtering using the above-described nickel-tungsten alloy as the target, a first layer (11) was formed on a transparent glass (3) at a thickness of 17 nm as shown in FIG. 4.

Then, 120 sccm of an argon gas, 240 sccm of a nitrogen gas, and 40 sccm of an oxygen gas were introduced into the sputtering apparatus and sputtering was carried out in the atmosphere of the film-forming pressure of about 2.5 mTorr at a sputtering electric power of 8.3 kW for 238 seconds. By the reactive gas sputtering using the above-described nickel-tungsten alloy as the target, a second layer (12) was formed on the first layer (11) at a thickness of 32 nm.

Then, 200 sccm of an argon gas was introduced into the sputtering apparatus and sputtering was carried out in the atmosphere of a film-forming pressure of about 2.0 mTorr at a sputtering electric power of 8.3 kW for 400 seconds. By the reactive gas sputtering using the above-described nickel-tungsten alloy as the target, a third layer (13) was formed in the second layer (12) at a thickness of 100 nm.

The total film thickness of a low-reflective thin-film substrate (14) of a three-layer structure obtained was 149 nm and the optical density thereof was 4.2, which showed the excellent light-shielding property of the low-reflective thin-film substrate.

Also, the relation of the wavelength of light and the reflectivity in the low-reflective thin-film substrate obtained is as shown in the curve D of FIG. 4, that is, the minimum reflectivity in the visible light region (i.e., the wavelength region of from 400 to 700 nm) was 0.12% when the wavelength was 610 nm and the maximum reflectivity thereof was 6.88%, which were very low.

Example 4

A film formation was carried out using the sputtering target made up of a nickel (55 wt. %)-copper (45 wt. %) alloy and using the transparent glass substrate and the sputtering apparatus as used in Example 1.

The sputtering apparatus was evacuated until the inside pressure became $2.0 \times 10^{-6}$ Torr or lower and then, after introducing 240 sccm of a nitrogen gas , 80 sccm of an oxygen gas, and 80 sccm of an argon gas into the sputtering apparatus, sputtering was carried out in the atmosphere of the film-forming pressure of about 2.5 mTorr at a sputtering electric power of 6.0 kW for 330 seconds. In this case, the temperature of the substrate was about 200° C. Also, in this case, by the reactive gas sputtering using the above-described nickel-copper alloy as the target, a first layer (1) was formed on a transparent glass (3) at a thickness of 45 nm as shown in FIG. 1 of the accompanying drawing.

Then, 140 sccm of an argon gas and 60 sccm of a nitrogen gas were introduced into the sputtering apparatus and sputtering was carried out in the atmosphere of the film-forming pressure of about 2.0 mTorr at a sputtering electric power of 8.3 kW for 550 seconds. By the reactive gas sputtering using the above-described nickel-copper alloy as the target, a second layer (2) was formed on the first layer (1) at a thickness of 140 nm.

The total film thickness of a low-reflective thin-film substrate (4) of the double-layer structure obtained was 185 nm and the optical density thereof was 4.1, which showed the excellent light-shielding property of the low-reflective thin-film substrate.

Figure 5:
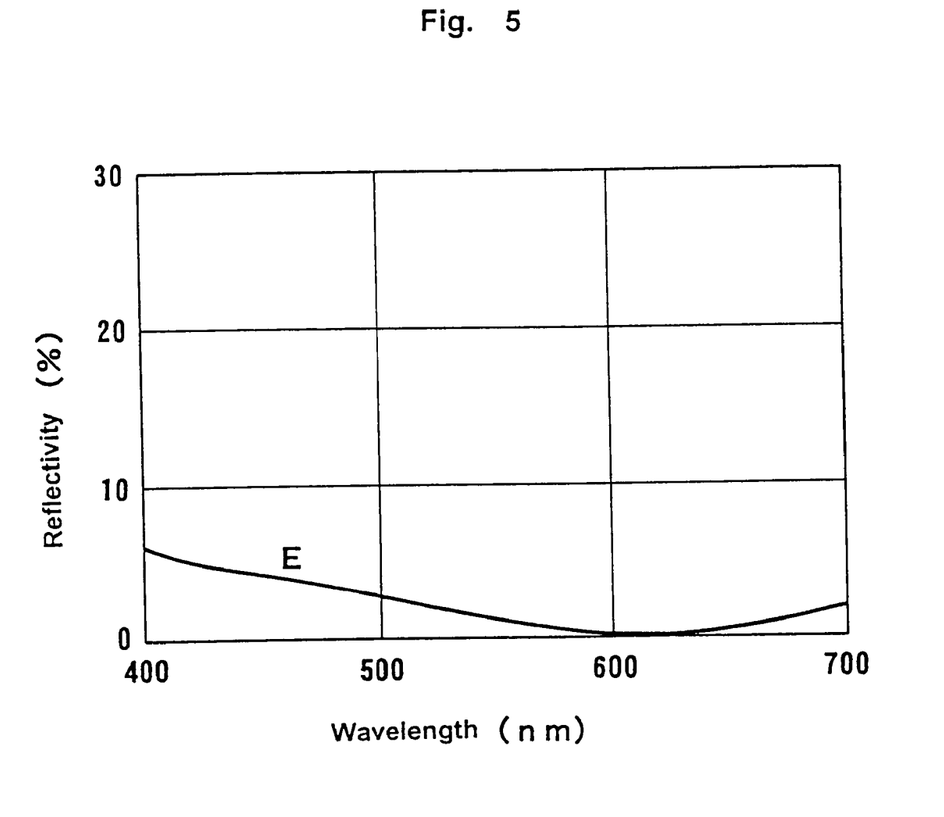
FIG. 5 is a graph illustrating the relation of the wavelength of light and the reflectivity in a low-reflective thin-film substrate, wherein curve E is the curve by the low-reflective nickel-copper alloy thin-film substrate of Example 4.

Also, the relation of the wavelength of light and the reflectivity in the low-reflective thin-film substrate obtained is as shown in the curve E of FIG. 5, that is, the minimum reflectivity in the visible light region (i.e., the wavelength region of from 400 to 700 nm) was 0.11% when the wavelength was 610 nm and the maximum reflectivity thereof was 6.06%, which were very low.

Example 5

A transparent glass substrate (thin plate glass, 1737 material, made by Corning Glass Works) was used as a transparent substrate and after washing to obtain a clean surface thereof, the transparent glass substrate was mounted on a batch-type reactive gas sputtering apparatus such that the glass substrate faced a sputtering target of a metal (containing 4 wt. % titanium) made up of aluminum as a main constituent.

The sputtering apparatus was evacuated until the inside pressure became 0.1 mTorr or lower, then 140 sccm of an argon gas and 60 sccm of a nitrogen gas were introduced into the sputtering apparatus, and sputtering was carried out in the atmosphere at a sputtering electric power of 10 kW for 10 minutes to form a film on a transparent glass substrate (3) as shown in FIG. 3 of the accompanying drawing. In this case, the film-forming pressure was kept at 1.8±0.3 mTorr. Also, in this case, the substrate was not heated at sputtering.

Then, by the reactive gas sputtering using as the target the above-described metal made up of aluminum as a main constituent, a first layer (11) was formed on the transparent glass substrate (3) at a thickness of 48 nm.

Then, 160 sccm of an argon gas and 40 sccm of a nitrogen gas were introducing into the sputtering apparatus and sputtering was carried out in the atmosphere of a film-forming pressure of 1.7±0.3 mTorr at a sputtering electric power of 10 kW for about 15 minutes without heating the substrate. By the reactive gas sputtering using as the target the above-described metal made up of aluminum as a main constituent, a second layer (12) was formed on the first layer (11) at a thickness of 293 nm.

Then, 200 sccm of an argon gas was introducing into the sputtering apparatus and sputtering was carried out in the atmosphere of the film-forming pressure of 2.1±0.3 mTorr at a sputtering electric power of 10 kW for about 3 minutes without heating the substrate. By the reactive gas sputtering using as the target the metal made up of aluminum as a main constituent, a third layer (13) was formed on the second layer (12) at a thickness of 51 nm.

The total average thickness of a low-reflective thin-film substrate (14) thus obtained was about 392 nm. Also, the optical density thereof was 5.1, which showed the excellent light-shielding property of the low-reflective thin-film substrate.

Figure 6:
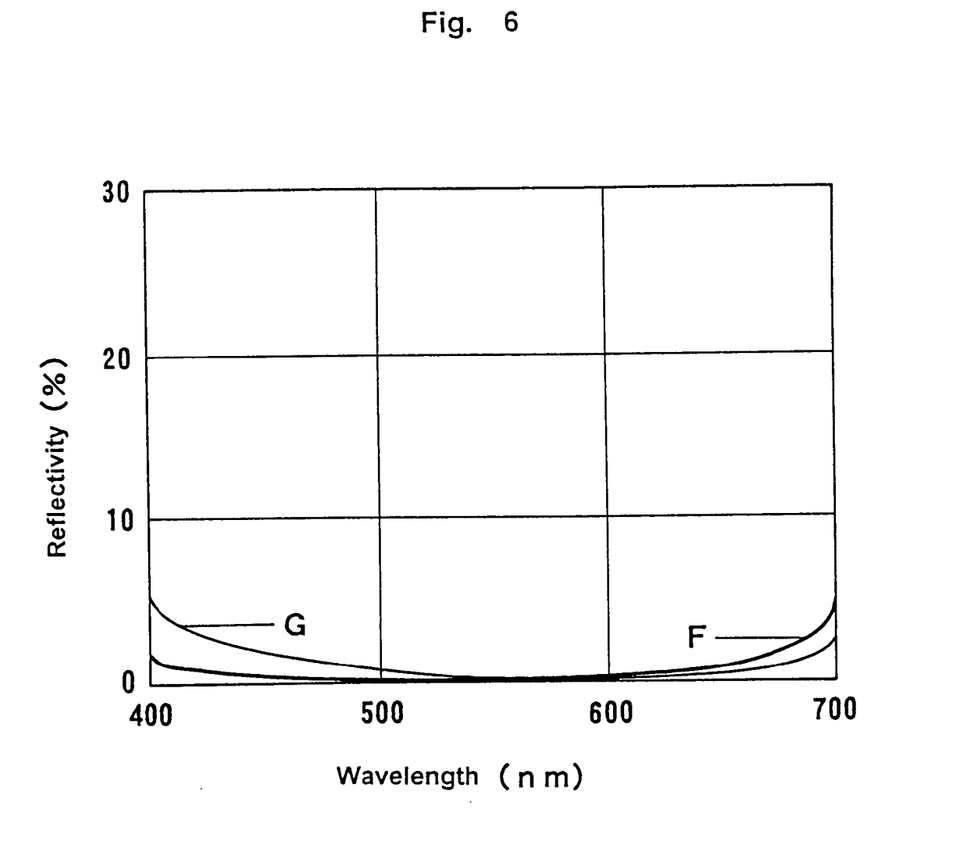
FIG. 6 is a graph illustrating the relation of the wavelength of light and the reflectivity in a low-reflective thin-film substrate, wherein curve F is the curve by the low-reflective aluminum thin-film substrate of the present invention and curve G is the curve by a low-reflective chromium thin-film substrate for comparison.

Also, the relation of the wavelength of light and the reflectivity in the low-reflective thin-film substrate was as shown by the curve F of FIG. 6, that is, the minimum reflectivity in the visible light region (i.e., the wavelength region of 400 to 700 nm) was 0.1% and the average reflectivity in the visible light region was 2% or lower.

For comparison, the reflectivity curve G of a low-reflective chromium thin-film substrate obtained using a chromium metal as the sputtering target was shown together in FIG. 6.

As is clear from the comparison of the curve F with the curve. G in FIG. 6, the low-reflective aluminum thin-film substrate of the present invention is by no means inferior to the low-reflective chromium thin-film substrate in regard to the minimum reflectivity, and also, the average reflectivity of the low-reflective aluminum thin-film substrate of the present invention is 0.93%, which is considerably lower than 1.9% of that of the low-reflective chromium thin-film substrate.

Example 6

Figure 7:
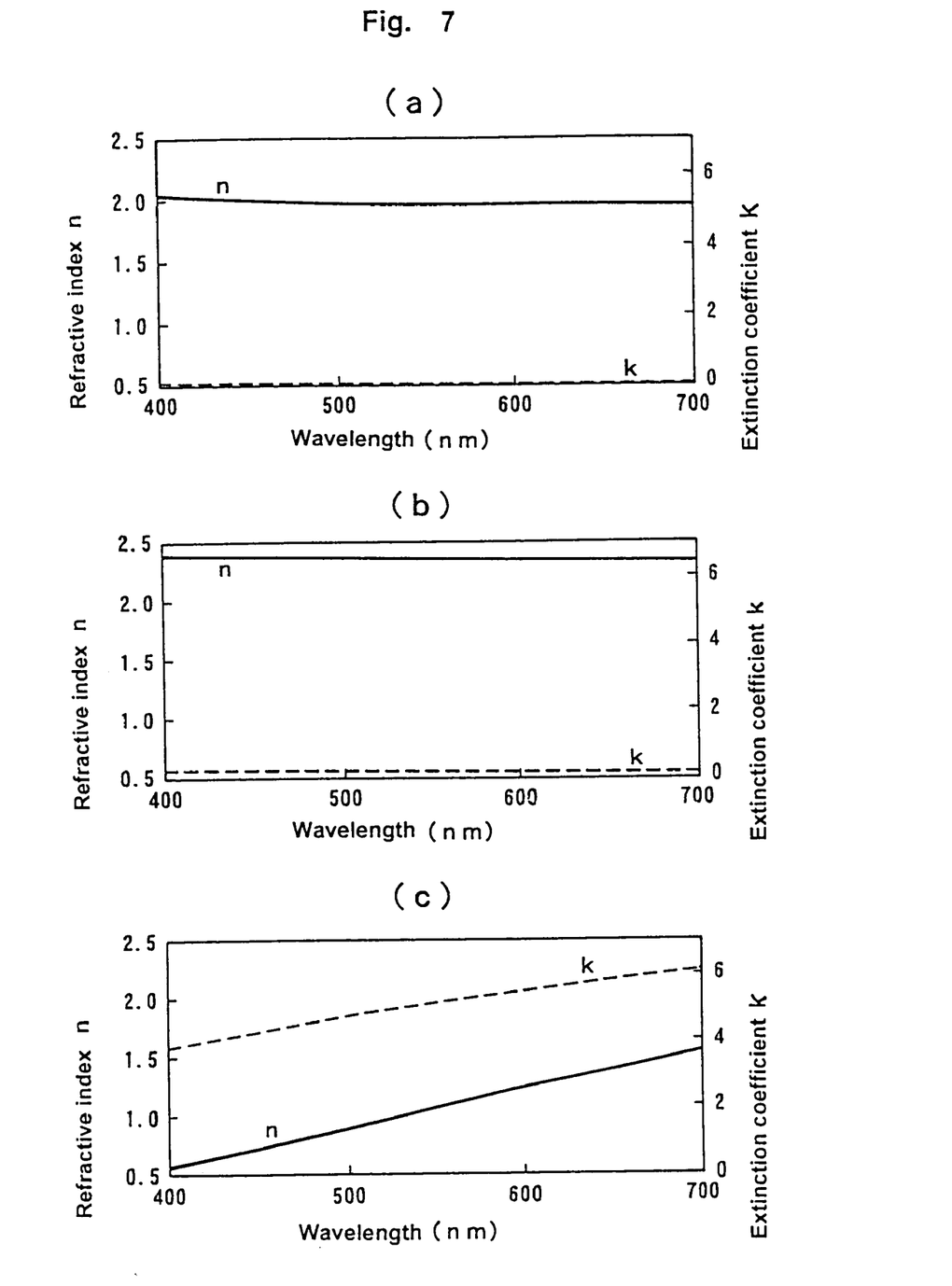
FIG. 7 is graphs simply illustrating the wavelength-refractive index characteristics obtained by forming a single layer of each of the layers of the low-reflective aluminum thin-film substrate of the present invention on a transparent glass substrate and measuring by an optical ellipsometer, wherein (a) shows the wavelength-refractive index characteristics of the first layer, (b) shows those of the second layer, and (c) shows those of the third layer.

Each single layer of the layers from the first layer to the third layer of the low-reflective aluminum thin-film substrate of Example 5 was formed on each transparent glass substrate and the refractive index thereof was evaluated using a spectral ellipsometer made by SOPRA Co. An example of the result thereof was shown in FIG. 7.

Example 7

A transparent glass substrate (thin plate glass, 7059 material, made by Corning Glass Works) was used as a transparent substrate and after washing to obtain a clean surface thereof, the transparent glass substrate was mounted on a batch-type reactive gas sputtering apparatus such that the glass substrate faced a sputtering target made up of a tantalum (Ta). In addition, the transparent glass substrate was not heated.

The sputtering apparatus was evacuated until the inside pressure became $2.0 \times 10^{-6}$ Torr or lower, then 200 sccm of an argon gas and 200 sccm of an oxygen gas were introduced into the sputtering apparatus, and sputtering was carried out in the atmosphere of the pressure of $2.2 \times 10^{-3}$ Torr at a sputtering electric power of 8.3 kW for about 27 minutes. By the reactive gas sputtering using tantalum as the target, a first layer (11) was formed on a transparent glass substrate (3) at a thickness of about 51 nm as shown in FIG. 3 of the accompanying drawing.

Then, 240 sccm of an argon gas and 160 sccm of a nitrogen gas were introducing into the sputtering apparatus and sputtering was carried out in the atmosphere of $2.3 \times 10^{-3}$ Torr at a sputtering electric power of 8.3 kW for about 5 minutes. By the reactive gas sputtering using tantalum as the target, a second layer (12) was formed on the first layer (11) at a thickness of about 35 nm.

Then, 200 sccm of an argon gas was introduced into the sputtering apparatus and sputtering was carried out in the atmosphere of $1.5 \times 10^{-3}$ Torr at a sputtering electric power of 8.3 kW for about 35 minutes. By the reactive gas sputtering using tantalum as the target, a third layer (13) was formed on the second layer (12) at a thickness of about 170 nm.

The total film thickness of a low-reflective thin-film substrate (14) of a three-layer structure obtained was about 256 nm. The optical density thereof was 4.2 and thus the low-reflective thin-film substrate obtained was excellent in the light-shielding property.

Figure 8:
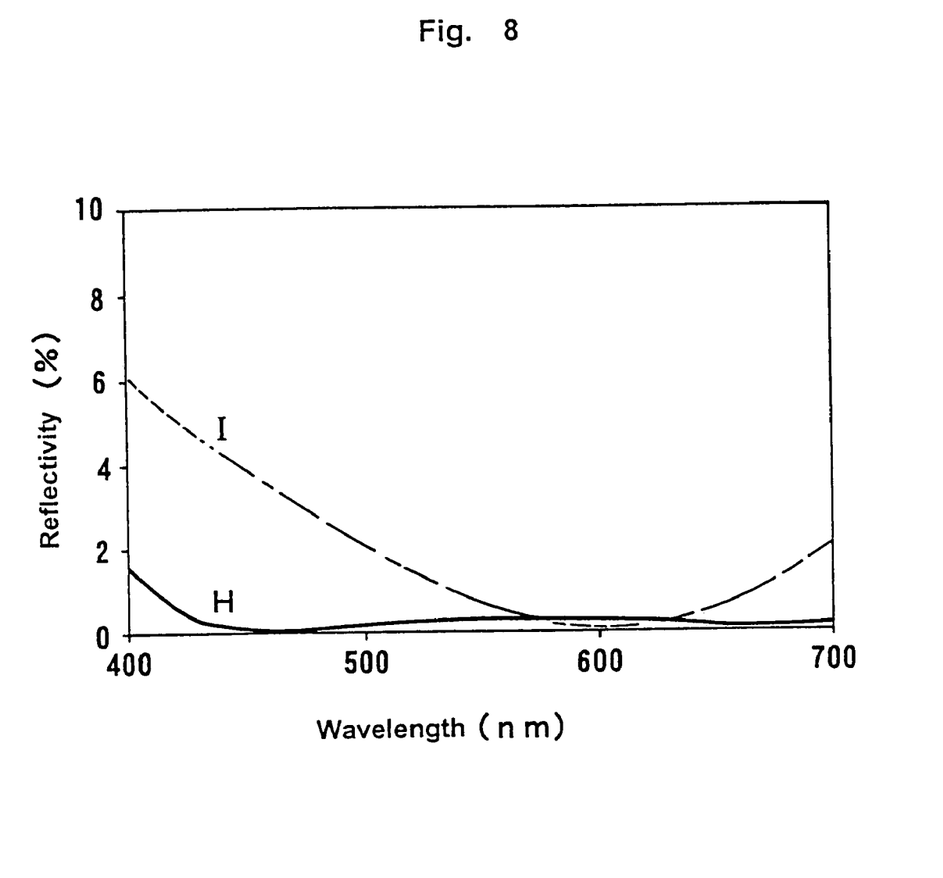
FIG. 8 is a graph illustrating the relation of the wavelength of light and the reflectivity in a low-reflective thin-film substrate, wherein curve H is the curve by the low-reflective tantalum thin-film substrate of the present invention and curve I is the curve by a low-reflective chromium thin-film substrate for comparison.

Also, the relation of the wavelength of light and the reflectivity in the low-reflective thin-film substrate was as shown in the curve H of FIG. 8, that is, the minimum reflectivity thereof was 0.01%, the maximum reflectivity was 1.53%, and the average reflectivity was 0.24% in the measured wavelength in the visible light region of from 400 to 700 nm, and thus the low-reflective thin-film substrate having a very low reflectivity was obtained.

For comparison, the reflectivity curve I of a low-reflective chromium thin-film substrate obtained using a chromium metal as the sputtering target is shown together in FIG. 8.

As is clear from the comparison of the curve H with the curve I in FIG. 8, the reflectivity of the low-reflective tantalum thin-film substrate of the present invention is low in a wide range of the measured wavelengths as compared with the low-reflective chromium thin-film substrate. In particular, it can be seen that the reflectivities in the wavelength of about 400 nm and the wavelength of about 700 nm are clearly low in the low-reflective tantalum thin-film substrate of the present invention as compared with the comparative low-reflective chromium thin-film substrate.

The reflective characteristic values of the low-reflective thin-film substrates are shown in Table 1 below. The range of the measured wavelength is from 400 nm to 700 nm.

TABLE 1

| Kind of low-reflective thin-film substrate (target material used) | Minimum reflectivity (%) | Reflectivity of each measured wavelength (%) | | Average reflectivity (%) |
|---|---|---|---|---|
| | | 400 nm | 700 nm | |
| Chromium | ≦0.01 | 6.10 | 2.08 | 1.76 |
| Tantalum | ≦0.01 | 1.53 | 0.15 | 0.23 |

In addition, it could be confirmed that in the low-reflective tantalum thin-film substrate of the present invention, the reflectivity which became maximum when the wavelength was 400 nm could be lowered to 1.0% or lower by delicately changing the total thickness of the first layer and the second layer and the layer ratio of these layers. On the other hand, in the case of the low-reflective chromium thin-film substrate, whereas when the reflectivity in the wavelength of 400 nm was lowered, the reflectivity in the wavelength of 700 nm became high, whereby the average reflectivity was not lowered too much.

It was similarly confirmed that as the target material, in addition to tantalum shown in the above-described Example, tantalum alloys containing at least one of nickel, iron, cobalt, tungsten, copper, and other elements were also useful.

Example 8

Figure 9:
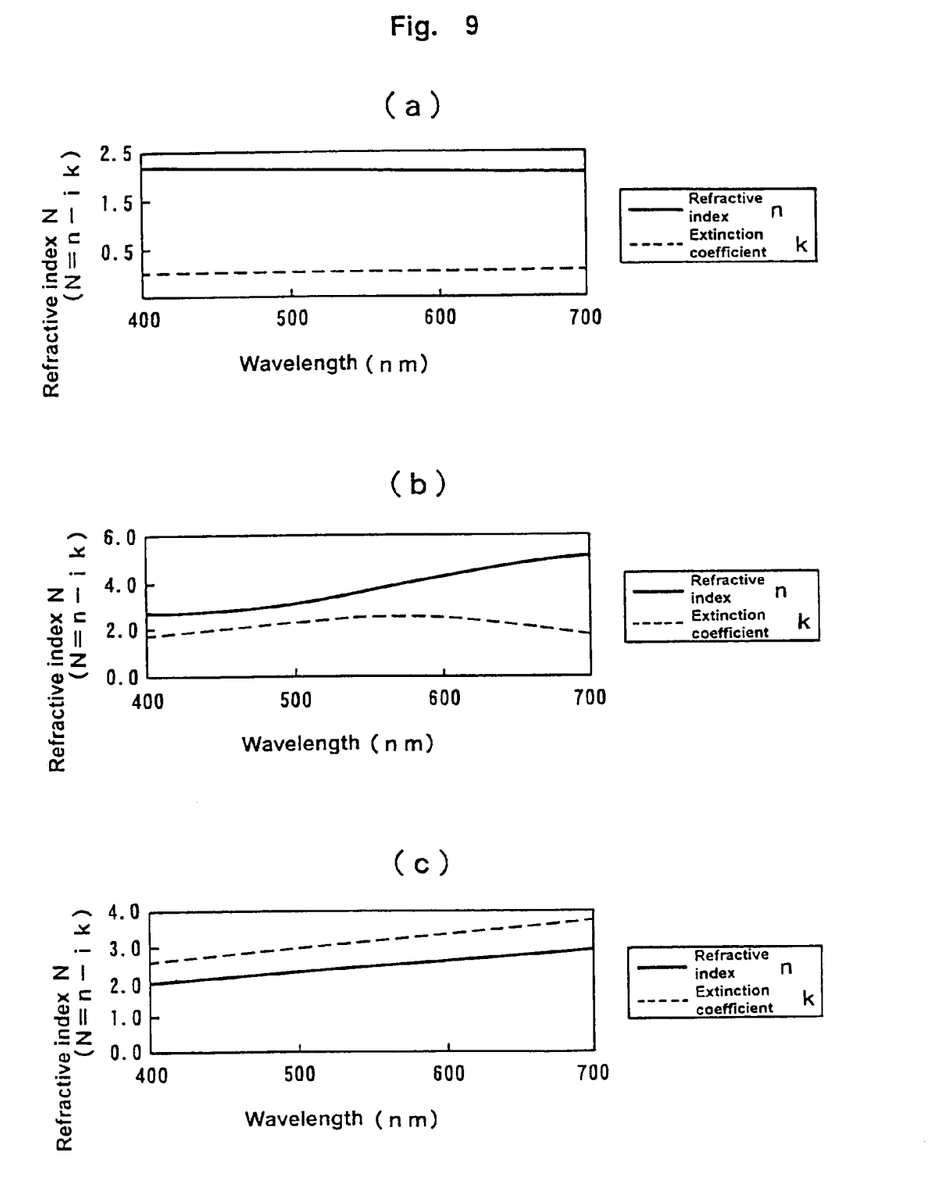
FIG. 9 is graphs simply illustrating the wavelength-refractive index characteristics obtained by forming a single layer of each of the layers of the low-reflective tantalum thin-film substrate of the present invention on a transparent glass substrate and measuring an optical ellipsometer, wherein (a) shows the wavelength-refractive index characteristics of the first layer, (b) shows those of the second layer, and (c) shows those of the third layer.

Each single layer of the layers from the first layer to the third layer of the low-reflective tantalum thin-film substrate of Example 7 was formed on each transparent glass substrate and the refractive index thereof was evaluated using a spectral ellipsometer made by SOPRA Co. An example of the results was shown in FIG. 9.

As described above, according to the present invention, a low-reflective thin-film substrate which meets with the tendency of self-discipline the use of a chromium metal in the production process of color liquid crystals, projectors, etc., does not contain chromium components, and has the characteristics such as the optical density, the reactivity, etc., that are by no means inferior to the characteristics of the low-reflective thin-film substrate prepared using a chromium series metal is provided. Furthermore, the low-reflective thin-film substrate of the present invention has the low reflectivity in a wide wavelength region of visible light, has the result that the form of the spectral reflectivity curve is flattened in a wide range, and thus the utilization thereof as the thin-film substrate having not only the function same as conventional low-reflective thin-film substrates but also having higher functions has been expected.

What is claimed is:

1. A low-reflective thin-film substrate comprising:
    a single thin film formed of a plurality of layers on a transparent glass substrate,
    wherein the thin film contains no chromium component and comprises an alloy of Ni and at least one of Fe, Mo, W and Cu,
    and wherein the low-reflective thin-film substrate has a reflectivity which is 0.5% or lower and an optical density of at least 4 at a wavelength in the visible light region.

2. The low-reflective thin-film substrate of claim 1, wherein the thin film is formed by sputtering under a gas atmosphere of at least one of an inert gas, an oxygen gas, and a carbon oxide gas in a vacuum film-forming apparatus.

3. The low-reflective thin-film substrate of claim 1, wherein the thin film further contains at least one of Ti, Zr and Sn.

4. The low-reflective thin-film substrate of claim 2, wherein the thin film further contains at least one of Ti, Zr and Sn.

5. The low-reflective thin-film substrate of claim 1, wherein each layer in said plurality of layers has different optical properties from one another.

* * * * *